United States Patent Office 3,285,808
Patented Nov. 15, 1966

3,285,808
CONTROL OF PLANT PATHOGENIC FUNGI WITH ALKYL ESTERS OF 4 - HALO - ACETOACETIC ACID
Daniel J. McCausland, Leawood, Kans., assignor to Gulf Oil Corporation, Pittsburgh, Pa., a corporation of Pennsylvania
No Drawing. Filed June 8, 1964, Ser. No. 373,492
3 Claims. (Cl. 167—22)

This invention relates to the control of fungi in soil. More particularly this invention is directed to the control of soil fungi which have damaging effects on roots and seeds of crop plants.

Fungus infections of plants and fungi-infested soils have in the past been treated principally with salts of derivatives of dithiocarbamic acids, or with rather toxic compounds of heavy metals. The best fungicides now available often possess disadvantages with respect to phytotoxicity, toxicity to animal life, or buildup of toxic substances in the soil, unless used at application rates so low as to fail to give the desired results. It is obviously desirable to control fungi, if possible, with chemical agents which possess very little toxicity to plant or animal life and which leave no accumulation of heavy metal compounds in the soil.

According to this invention there is applied to soil which contains a plant pathogenic fungus an effective amount of an ester of 4-chloro or 4-bromo-acetoacetic acid. The preferred compositions for this purpose are ethyl and methyl 4-bromo and 4-chloro acetoacetates. It has been discovered that the 4-halo-acetoacetates may be used to control fungi with a minimum of damage to growing crop plants. Below are presented the method of testing effectiveness of the disclosed compounds as soil fungicide as well as test results obtained on ethyl 4-bromo acetoacetate and ethyl 4-chloro acetoacetate.

SOIL FUNGICIDE EVALUATION

Method

Soil infested with seed and root-rotting organisms is mixed with test chemicals in a Patterson-Kelly blender. The soil-chemical mixture is poured into wax cartons, peas are planted, water added and the treatment incubated at 65° F. Ratings, after crop emergence, are made as follows.

Plant protection/phytotoxicity:
 0/1=seed rotted
 1/1=3 to 4 healthy plants; 25% germination
 4/4=9 to 10 healthy plants; 100% germination Tabulated results

| Compound | Rate (lbs./acre) | Test Results |
|---|---|---|
| Ethyl 4-bromoacetoacetate | 100 | 4/4 |
|  | 50 | 4/4 |
|  | 25 | 4/4 |
|  | 12.5 | 4/4 |
|  | 6.25 | 4/4 |
| Ethyl 4-chloroacetoacetate | 100 | 4/4 |
|  | 50 | 4/4 |
|  | 25 | 4/4 |
|  | 12.5 | 4/4 |
|  | 6.25 | 4/4 |
| Captan [N-(trichloromethylmercapto)-4-cyclohexene-1,2-dicarboximide]. | 100 | 4/4 |
|  | 50 | 4/4 |
|  | 25 | 4/4 |
|  | 12.5 | 4/4 |
|  | 6.25 | 4/4 |
| Check |  | 0/- |

In practical tests, ethyl 4-bromoacetoacetate was mixed with moist, pasteurized, artificially infested soil at a rate of 25 pounds per acre. Effectiveness against damping-off incited by *Pythium aphanidermatum* was then tested at a soil temperature of 85° F. In control experiments with no fungicide damping-off was complete. However, ethyl 4-bromo-acetoacetate gave 100 percent control of damping-off on the following crops: alfalfa, beans, beets, cabbage, carrots, cucumbers, eggplant, lettuce, oats, okra, peas and spinach. On cotton, 75 percent control of cotton root-rot was obtained. Ethyl 4-bromoacetoacetate was demonstrated to be superior to Captan in controlling damping-off of eggplant, spinach and crucifer crops such as cauliflower, broccoli and Brussels sprouts.

In view of these results, it is not surprising that control of other fungus infestations may also be obtained. For example, ethyl 4-bromoacetoacetate gave results equivalent to Captan on cotton and better than Captan on spinach when used to control *Rhizoctonia solani*. The same fungicide effectively controlled cucumber wilt caused by *Fusarium solani F. cucurbitae* and has also shown promise for the control of *Fusarium solani* root-rot of beans and *Sclerotium rolfsii* root-rot of cotton.

It is particularly noteworthy that the beneficial effects discussed above have been obtained without the appearance of observable phytotoxicity. Furthermore, no adverse after-effects on the treated soil have been observed.

The 4-haloacetoacetates are preferably applied to the soil at or near planting time, for example, by means of a spray directed into the furrow in which the seed are planted. The fungicide is preferably dispersed in water with the aid of an emulsifier, dispersing agent or solubilizer, optionally with the use of auxiliary solvents. The specific alcohol employed to make the ester has a practical effect on the solubility and dispersibility of the substance, the lower alkyl esters being preferred, as they are less oily and in general are cheaper. The higher alkyl esters are particularly useful in the preparation of fungicide dusts, employing a finely divided inert solid diluent. Various modifications in the disclosed formulations and application techniques are within the scope of the present invention, as practiced by those who are skilled in the art.

The solid fungicides employed in the method of this invention are not readily available as articles of commerce. A suitable procedure for preparing ethyl 4-bromoacetoacetate is presented below.

Ethyl acetoacetate (520 parts by weight) was placed in a reactor which was surrounded by an ice bath. Over a period of one hour, 640 parts by weight of bromine was added slowly, with agitation and cooling. The resulting reaction product was allowed to stand at room temperature until the following day and was then poured onto ice. The organic layer was separated, washed twice with ice water, twice with saturated aqueous sodium bicarbonate solution and again with ice water. The organic layer was then separated and dried over anhydrous sodium sulfate. The dried organic product was then passed through a Rodney Hunt falling film evaporator at 0.15 to 0.2 mm. pressure and a jacket temperature of 60–70° C. There was obtained 145 parts by weight of purified product, ($N_D^{18}$ 1.4819). A substantial amount of a relatively non-volatile residue, ($N_D^{18}$ 1.5226) remained.

What is claimed is:

1. A method for controlling plant pathogenic fungi in soil comprising applying to soil an effective amount of an alkyl ester of a compound selected from the group consisting of 4-chloroacetoacetic acid and 4-bromoacetoacetic acid.

2. A method for controlling plant pathogenic fungi in soil comprising applying to soil an effective amount of ethyl 4-bromoacetoacetate.

3. A method for controlling plant pathogenic fungi in soil comprising applying to soil an effective amount of ethyl 4-chloroacetoacetate.

References Cited by the Examiner

UNITED STATES PATENTS 3,017,319  1/1962  Rader _____ 167—22 X

JULIAN S. LEVITT, *Primary Examiner.*
V. C. CLARKE, *Assistant Examiner.*